(12) United States Patent
Zhang et al.

(10) Patent No.: US 11,081,000 B2
(45) Date of Patent: Aug. 3, 2021

(54) METHOD AND SYSTEM FOR GENERATING HEADING INFORMATION OF VEHICLES

(71) Applicant: HERE GLOBAL B.V., Eindhoven (NL)

(72) Inventors: Zhenhua Zhang, Chicago, IL (US); Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 286 days.

(21) Appl. No.: 16/034,217

(22) Filed: Jul. 12, 2018

(65) Prior Publication Data

US 2020/0020230 A1    Jan. 16, 2020

(51) Int. Cl.
*G01C 21/32* (2006.01)
*G08G 1/0962* (2006.01)
*G01C 21/34* (2006.01)
*G01C 21/20* (2006.01)

(52) U.S. Cl.
CPC ......... *G08G 1/09623* (2013.01); *G01C 21/20* (2013.01); *G01C 21/32* (2013.01); *G01C 21/3492* (2013.01)

(58) Field of Classification Search
CPC ............ G08G 1/09623; G01C 21/3492; G01C 21/32; G01C 21/20; G01C 21/3626; G01C 21/30
See application file for complete search history.

(56) References Cited

U.S. PATENT DOCUMENTS

| 8,489,316 B1* | 7/2013 | Hedges | G01C 21/30 701/300 |
| 2015/0345974 A1* | 12/2015 | Takahashi | B60W 50/14 701/461 |
| 2016/0104376 A1* | 4/2016 | Fowe | G08G 1/0129 701/119 |
| 2017/0308989 A1 | 10/2017 | Lee et al. | |

FOREIGN PATENT DOCUMENTS

| CN | 1908588 A1 | 2/2007 |
| CN | 101996483 A | 3/2011 |
| WO | 2018017793 A1 | 1/2018 |

* cited by examiner

*Primary Examiner* — Genna M Mott
(74) *Attorney, Agent, or Firm* — Ditthavong, Steiner & Mlotkowski (57) ABSTRACT

A method, system, and computer program product is provided, for example, for generating heading information. The method comprises receiving a coordinate information for a gantry. The method further comprises receiving an identification information for a link associated with the gantry. Additionally, the method comprises extracting information related to one or more shape points associated with the link based on the identification information. Further, the method comprises matching the coordinate information for the gantry with at least two consecutive shape points from the one or more shape points, wherein the at least two consecutive shape points are closest from the gantry. Also, the method comprises calculating, by a processor, a heading value for the gantry based on the matching. The heading value for the gantry may be used to identify direction information for the gantry, which may further be used for updates.

20 Claims, 6 Drawing Sheets

METHOD AND SYSTEM FOR GENERATING HEADING INFORMATION OF VEHICLES

TECHNOLOGICAL FIELD

The present disclosure generally relates to a system and method for providing assistance to a driver of a vehicle or the vehicle itself, and more particularly relates to a system and method for using a map database for identifying information related to direction of travel of vehicles on a link.

BACKGROUND

Map based applications are used in many navigation applications in vehicles. The map can be used as a source of speed limit information, traffic sign information, variable speed signs (VSS) related information, and direction related information for traffic signs, such as speed signs posted on gantries and the like. The navigation applications rely on map data for performing various navigation assisted functions. Thus, the map database should be provided with accurate and up-to-date data.

The map database may receive data related to direction or heading of traffic signs, specifically traffic signs posted on gantries, via ingestion of vehicle smart sensor data (sensor data) and analysis, coding and distribution of relevant information derived from the sensor data and conflated with other sources. Thus, using data from vehicle sensors, the map database can be updated daily.

However, vehicle sensors can only provide limited amount of data, specifically related to gantries.

BRIEF SUMMARY

In light of the above-discussed problems, there is a need to derive accurate direction related data for VSS gantries.

Current VSS gantry collections only provide the latitude and longitude of the gantries, as well as the upstream and downstream Link PVID. Current problem lies in how to use the limited information to map match the gantries to the correct links and further generate the heading.

Knowing the correct heading of a VSS gantry is very important for using the VSS information in many navigation related applications. For example, knowing the correct heading of a gantry can help to suppress vehicle related misclassification of some posted road signs.

In an example embodiment, a method for generating a heading value for a gantry is provided. The method may include receiving a coordinate information for the gantry. The method may further include receiving an identification information for a link associated with the gantry. Additionally, the method may include extracting information related to one or more shape points associated with the link based on the identification information. Further, the method may include matching the coordinate information for the gantry with at least two consecutive shape points from the one or more shape points, wherein the at least two consecutive shape points are closest from the gantry. The method may also include calculating, by a processor, the heading value for the gantry based on the matching.

In some example embodiments, a mapping platform may be provided. The mapping platform may include at least one processor and at least one memory including computer program code for one or more programs. The at least one memory and the computer program code configured to, with the at least one processor, cause the map database to at least receive a coordinate information for a gantry. The computer program code further configured to cause the map database to receive an identification information for a link associated with the gantry. Further, the computer program code further configured to cause the map database to extract information related to one or more shape points associated with the link based on the identification information. Additionally, the computer program code further configured to cause the map database to match the coordinate information for the gantry with at least two consecutive shape points from the one or more shape points, wherein the at least two consecutive shape points are closest from the gantry. Also, the computer program code further configured to cause the map database to calculate a heading value for the gantry based on the matching. The heading value can be used to determine direction information for the gantry. In some embodiments, the direction information may be stored in the map database for use in navigation related applications using the map database for retrieving navigation related data.

In some example embodiments a computer program product is provided. The computer program product comprising at least one non-transitory computer-readable storage medium having computer-executable program code instructions stored therein, the computer-executable program code instructions comprising program code instructions for receiving a coordinate information for a gantry. The computer-executable program code instructions further comprising program code instructions for receiving an identification information for a link associated with the gantry. The computer-executable program code instructions comprising program code instructions for extracting information related to one or more shape points associated with the link based on the identification information. The computer-executable program code instructions further comprising program code instructions for matching the coordinate information for the gantry with at least two consecutive shape points from the one or more shape points, wherein the at least two consecutive shape points are closest from the gantry. The computer-executable program code instructions additionally comprising program code instructions calculating a heading value for the gantry based on the matching.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Having thus described example embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference, numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention. A method, apparatus, and computer program product are provided herein in accordance with an example embodiment for providing heading related information for vehicles in general. The heading related information for vehicles is derived from a heading value of a gantry, which is calculated on the basis of limited amount of location coordinate information available in a map database. The heading related information and thus heading value of gantry may then be updated in the map database for use in navigation related applications using the map database. These navigation related applications may include such as route guidance, assisted driving functions, autonomous driving assistance in a vehicle and the like.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Speed limit values may be displayed on electronic signs positioned next to the road, over a portion of the traffic lanes, or overhead each traffic lane such as on overhead gantries on road sections or on a link. In certain embodiments, the electronic signs may be displayed on a gantry extending over a portion of a link, such as a roadway. These electronic signs could be the variable speed signs (VSSs), which have become an important component of automotive cloud technology, highly assisted driving (HAD) technology and advanced driving assistance systems (ADAS). Vehicles may have high definition cameras and/or advance radar systems that can read the displayed value on the VSS from a distance away. VSS speed values may be variable and a function of one or more of weather, traffic, time of day, day of week, construction, or other factors. For example, weather related VSS may be used on roads where fog, ice, rain, snow, or other factors may influence safety. When weather conditions deteriorate visibility to the point that hazardous conditions are impending, the operating agency may adjust (e.g., reduce) the speed limit to help minimize the likelihood of a traffic accident. Traffic congestion related VSS may be used when traffic volumes are building and congestion is likely. When volumes and/or speed exceed a predetermined threshold, an operational strategy may be deployed to handle more traffic volume at a reduced, but not stop-and-go, speed.

Apart from the VSS speed values being used to follow speed limit regulations, the VSS posted on the gantry may also be used to provide important information to be used in navigation related applications, such as the heading or direction related information of the vehicles approaching the gantry. Such heading information may be represented by a heading value of the gantry and may be stored in a map database of a mapping platform for use by vehicles using navigation and other services provided by the mapping platform. The VSS gantries may be associated with specific information stored in the map database, in the form of VSS gantry records or VSS gantry collections.

Current VSS gantry collections only provide the latitude and longitude of the gantries, as well as an upstream and downstream Link PVID. When a vehicle is approaching a gantry, the link associated with the direction of travel of the vehicle may be the upstream link. However, when the vehicle is moving away from the gantry, the link associated with the direction of travel of the vehicle may be the downstream link. Both the upstream link and the downstream link may be associated with their respective identification information, which may be stored in the map database. The upstream link identification may be the upstream link PVID and the downstream link identification may be the downstream link PVID.

The methods and systems disclosed in the embodiments discussed herein provide for using the limited information available in the map database related to identifications of links, to map match the gantries to the correct links, such as the upstream link and/or the downstream link and further generate the heading value for the gantry which may be used in many applications.

Knowing the correct heading value of a VSS gantry is important for many applications related to navigation. For example, the heading value of the gantry may be used to suppress vehicle misclassifications in the static speed sign product.

Figure 1:
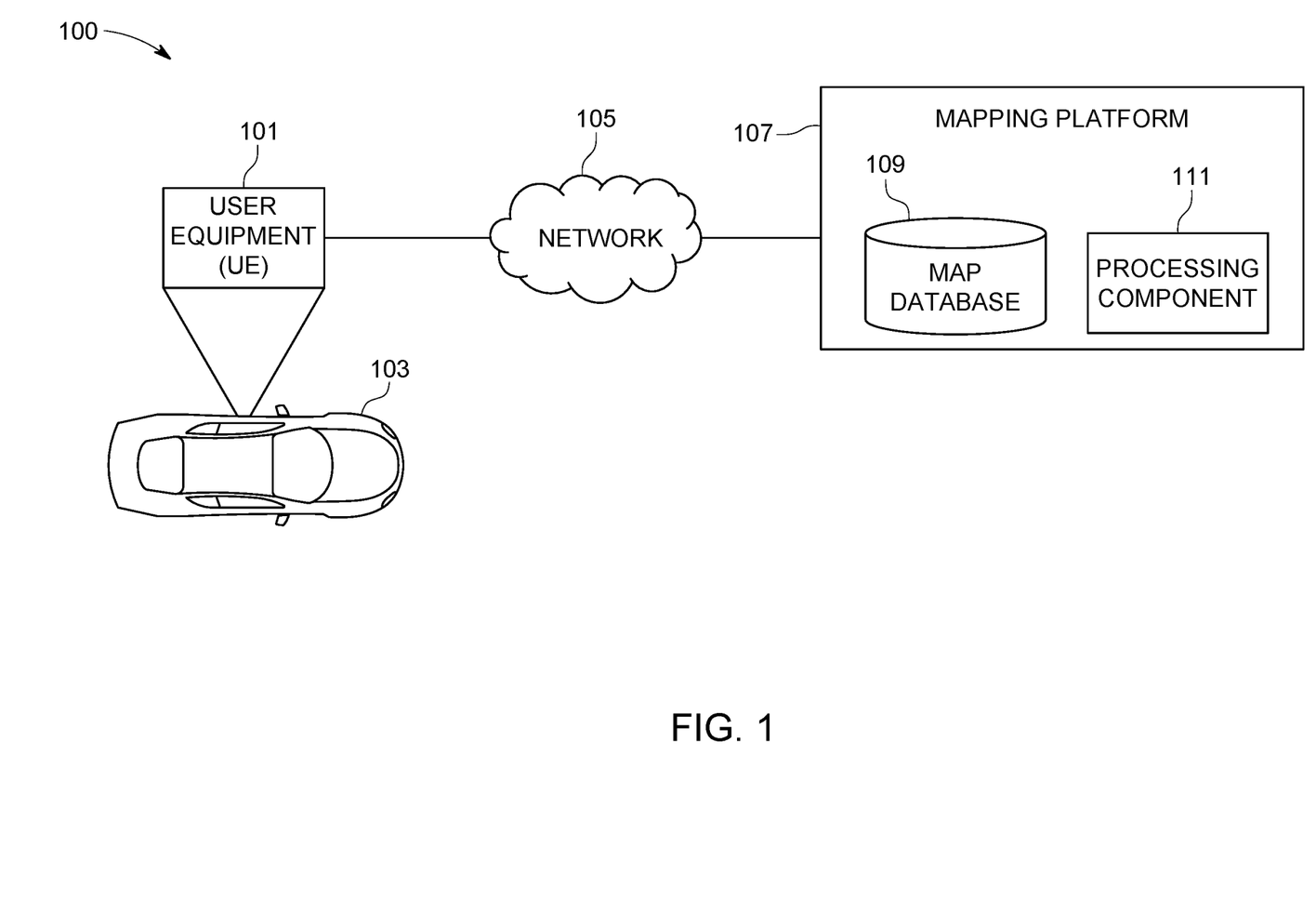
FIG. 1 illustrates a block diagram of a system for providing heading information for a gantry in accordance with an example embodiment.

FIG. 1 illustrates a block diagram of a system 100 for providing heading information for a gantry in accordance with an example embodiment.

The system 100 of FIG. 1 includes a user equipment 101 installed in a vehicle 103, which may be connected to a mapping platform 107 over a network 105.

The network 105 may be wired, wireless, or any combination of wired and wireless communication networks, such as cellular, Wi-Fi, internet, local area networks, or the like.

The user equipment 101 may be a navigation system, such as an advanced driver assistance system (ADAS), that may be configured to provide route guidance and navigation related functions to the user of the vehicle 103.

In some example embodiments, the user equipment 101 may include a mobile computing device such as a laptop computer, tablet computer, mobile phone, smart phone, navigation unit, personal data assistant, watch, camera, or the like. Additionally or alternatively, the user equipment 101 may be a fixed computing device, such as a personal computer, computer workstation, kiosk, office terminal computer or system, or the like. The user equipment 101 may be configured to access the mapping platform 107 via a processing component 111 through, for example, a mapping application, such that the user equipment 101 may provide navigational assistance to a user.

The mapping platform 107 may include a map database 109, which may include node data, road segment data, link data, point of interest (POI) data, link identification information, heading value records or the like. The map database 109 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 109 may contain path segment and node data records, such as shape points or other data that may represent pedestrian paths, links or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 109 can include data about the POIs and their respective locations in the POI records. The map database 109 may additionally include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 109 can include event data (e.g., traffic incidents, construction activities, scheduled events, unscheduled events, accidents, diversions etc.) associated with the POI data records or other records of the map database 109 associated with the mapping platform 107.

A content provider e.g., a map developer may maintain the mapping platform 107. By way of example, the map developer can collect geographic data to generate and enhance mapping platform 107. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Crowdsourcing of geographic map data can also be employed to generate, substantiate, or update map data. For example, sensor data from a plurality of data probes, which may be, for example, vehicles traveling along a road network or within a venue, may be gathered and fused to infer an accurate map of an environment in which the data probes are moving. The sensor data may be from any sensor that can inform a map database of features within an environment that are appropriate for mapping. For example, motion sensors, inertia sensors, image capture sensors, proximity sensors, LIDAR (light detection and ranging) sensors, ultrasonic sensors etc. The gathering of large quantities of crowd-sourced data may facilitate the accurate modeling and mapping of an environment, whether it is a road segment or the interior of a multi-level parking structure. Also, remote sensing, such as aerial or satellite photography, can be used to generate map geometries directly or through machine learning as described herein.

The map database 109 of the mapping platform 107 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, driving maneuver related functions and other functions, by a navigation device, such as by user equipment 101, for example. The navigation device may be used to perform navigation-related functions that can correspond to vehicle navigation, pedestrian navigation, and vehicle lane changing maneuvers, vehicle navigation towards one or more geo-fences, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

In some embodiments, the mapping platform 107 may be a master geographic database configured at a server side, but in alternate embodiments, a client side-mapping platform 107 may represent a compiled navigation database that may be used in or with end user devices (e.g., user equipment 101) to provide navigation and/or map-related functions. For example, the mapping platform 107 may be used with the end user device 101 to provide an end user with navigation features. In such a case, the mapping platform 107 can be downloaded or stored on the end user device (user equipment 101) which can access the mapping platform 107 through a wireless or wired connection, over the network 105. This may be of particular benefit when used for navigating within spaces that may not have provisions for network connectivity or may have poor network connectivity, such as an indoor parking facility, a remote street near a residential area and the like. As many parking facilities are multi-level concrete and steel structures, network connectivity and global positioning satellite availability may be low or non-existent. In such cases, locally stored data of the mapping platform 107 regarding the parking spaces may be beneficial as identification of suitable parking spot in the parking space could be performed without requiring connection to a network or a positioning system. In such an embodiment, various other positioning methods could be used to provide vehicle reference position within the parking facility, such as inertial measuring units, vehicle wheel sensors, compass, radio positioning means, etc.

In one embodiment, the end user device or user equipment 101 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 101 for navigation and map functions such as guidance and map display, for example, and for determination of one or more personalized routes or route segments, direction of travel of vehicle, heading of vehicles and the like. The direction of travel of the vehicle may be derived based on the heading value associated with a gantry on a link, such as a roadway segment.

Figure 2:
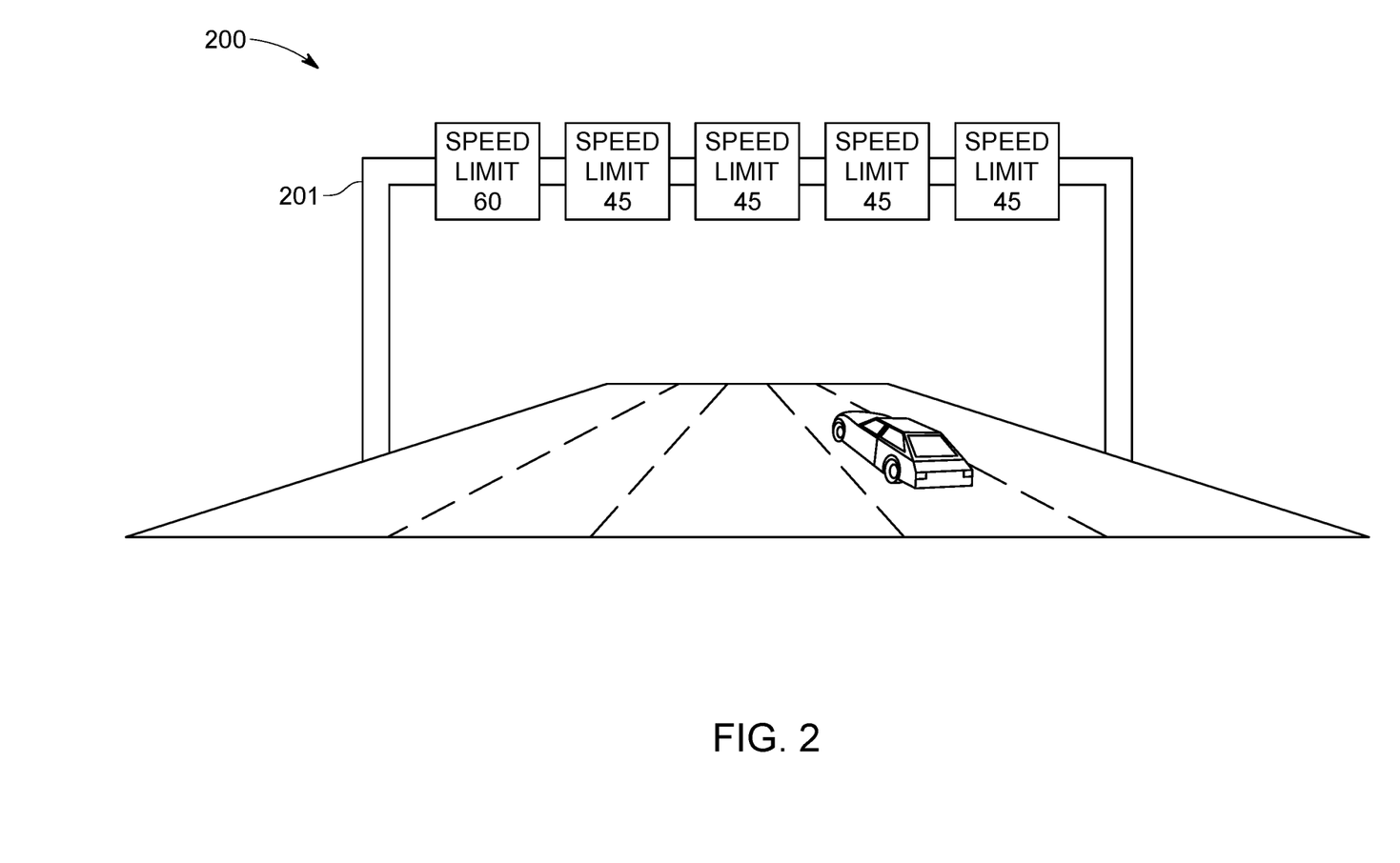
FIG. 2 illustrates a diagram of a variable speed sign gantry in accordance with an example embodiment.

FIG. 2 illustrates a diagram 200 of a variable speed sign gantry 201 in accordance with an example embodiment. The gantry 201 may display the variable speed signs displaying speed limits for vehicles on the link. The VSS signs may include a number of different electronic signs connected to the gantry 201 and displayed over traffic lanes of a roadway. As depicted in FIG. 2, an electronic sign is positioned over each traffic lane to display the actual speed limit value for the traffic lanes or for individual traffic lanes. In some example embodiments, a single electronic sign may be positioned over one of the traffic lanes, or on the side of the road next to the traffic lanes. In yet other embodiments, a plurality of electronic signs less than the total number of traffic lanes may be positioned over or next to a portion of the traffic lanes of the roadway. In certain embodiments, the electronic sign(s) may include variable speed limit values. The signs posted on the gantry 201 may also include additional text such as "CAR" or "TRUCK," to provide additional information regarding which vehicles the displayed speed limit value pertains (e.g., the variable speed limit value for a car could be 60 while the speed limit value for a truck could be 50).

The gantry 201 may be associated with coordinate information such as a latitude coordinate (LatG) and a longitude coordinate (LonG). The coordinate information of the gantry 201 may be stored as a record (LatG, LonG) in the map database 109 of the mapping platform 107.

The methods and systems disclosed in the embodiments discussed herein may be configured to use the coordinate information (LatG, LonG) of the gantry 201 to identify a heading value for the gantry 201. The heading value for the gantry 201 may in turn be used to find heading information for vehicles travelling on the links in vicinity of the gantry, such as the roadway segments depicted in FIG. 2. Further, the heading value of the gantry 201 may also be used to find direction information for the vehicles travelling on the links in the vicinity of the gantry and using the mapping platform 107 for accessing navigation related applications. Though the methods and systems disclosed herein have been described for a gantry, but it may be understood by a person of ordinary skill in the art that the methods and systems disclosed herein may also be used for other kinds of locations with only latitude and longitude, and origin and destination link identification information available.

In some example embodiments, the gantry 201 may be associated with an origin link, such as the upstream link discussed earlier. The gantry 201 may also be associated with a destination link, such as the downstream link. Each link may be associated with an identification information. The identification information for the link may be PVID information available in the map database 109.

The map database 109 may also include information related to shape points. Shape points may be the shape segments representing curvature information of various links, such as roadway segments, highway segments, roads, expressways and the like. Each shape point may be associated with coordinate information, such as latitude and longitude information. The intersections of shape points may be represented as nodes in the map database 109. For example, the geometry of a road including multiple shape points and a gantry is illustrated by the block diagram of FIG. 3.

Figure 3:
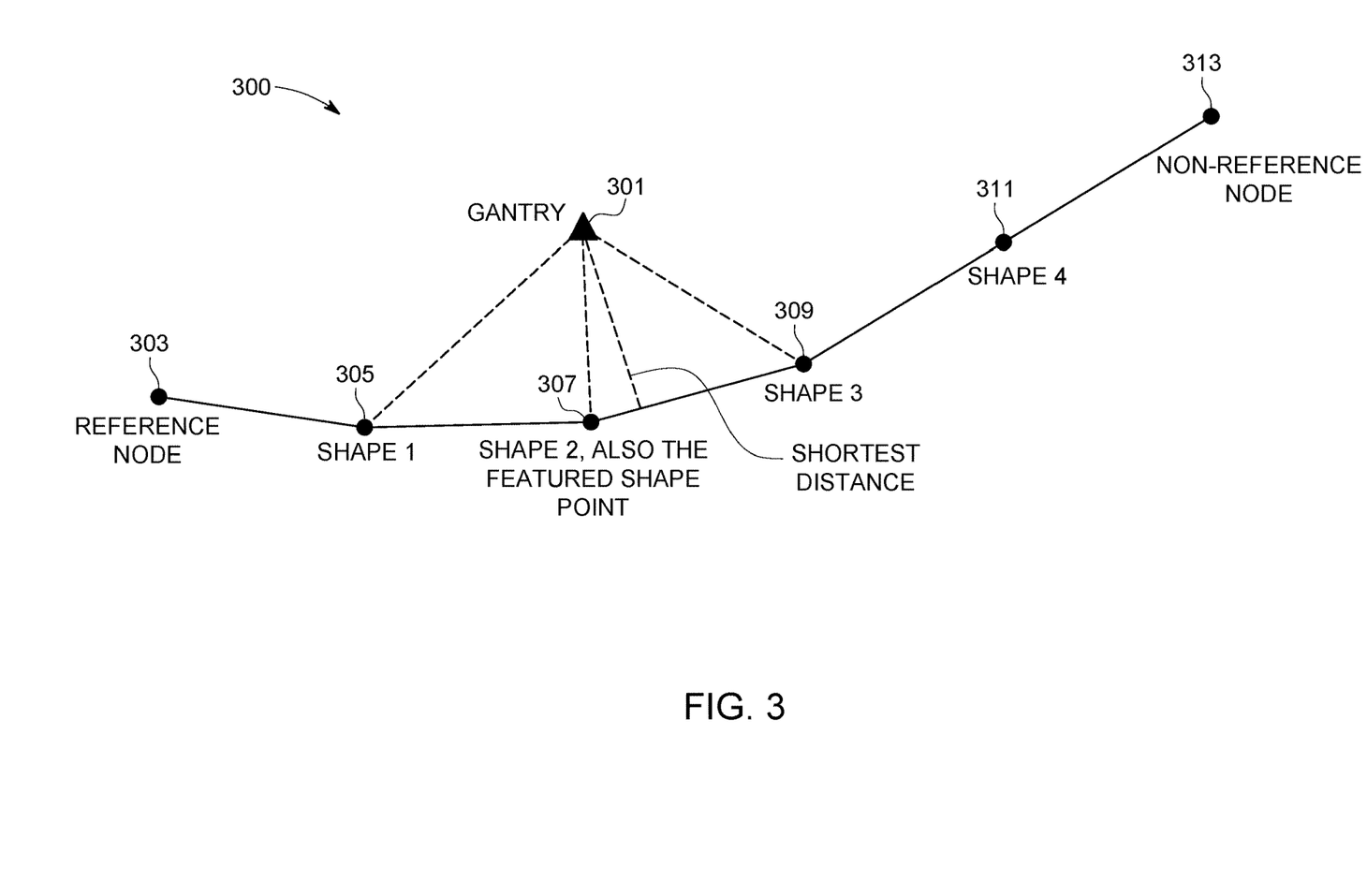
FIG. 3 illustrates an exemplary diagram illustrating a geometrical representation of a link and associated shape points for a gantry according to an example embodiment.

FIG. 3 illustrates an exemplary diagram of a link 300 for illustrating a geometrical representation of a link and associated shape points for a gantry 301 according to an example embodiment. The figure illustrates the link 300 having a starting reference node 303 and an ending non-reference node 313. The reference node 303 and the non-reference node 313 may define the entry and exit points on a link for a vehicle for a current frame of time reference. That is to say, at a particular time instant, the vehicle may be travelling from the reference node 303 to the non-reference node 313 on the link 300.

The link 300 may be a combination of a plurality of segments, such as shape points. For example the link 300 is made up of plurality of shape points such as shape 1, shape 2, shape 3, and shape 4. The intersection of two segments depict a node, such as the nodes 305, 307, 309, and 311. The gantry 301 may be located anywhere on the link 300. At any point in time, the gantry 301 will be closest to any two consecutive shape points on the link. For example, the gantry 301 on the link 300 is closest to shape 2 and shape 3. The shortest distance of the gantry 301 from the two consecutive shape points, shape 2 and shape 3 can be determined based on the coordinates of the shape points. The coordinates of the shape points may be retrieved from the map database 109 of the mapping platform 107. For example, a vehicle, such as the vehicle 103, travelling on the link 300 and equipped with a navigation system, such as the user equipment 101, may be in communication with the mapping platform 107. The navigation system may retrieve coordinates of the shape points, shape 2 and shape 3, if needed, from the map database 109 of the mapping platform 107, over the network 105.

The map database 109 may store information related to shape points, coordinate information for different shape points, link identification related information and the like, in the form of different records in the map database 109.

Figure 4A:
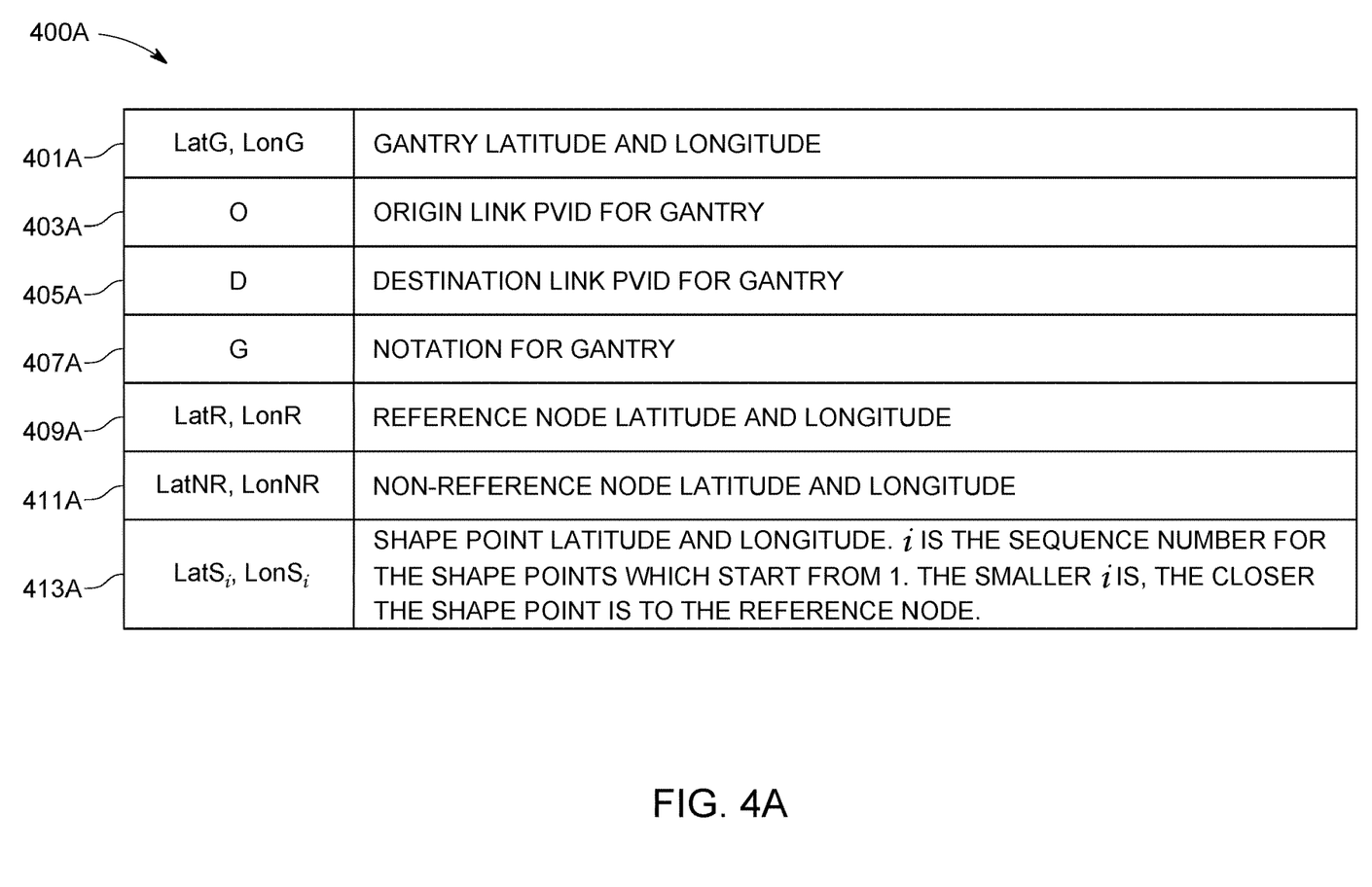
FIGS. 4A-4B illustrate exemplary diagrams of a data records and procedures stored in a map database for identifying heading information for a gantry according to an example embodiment.

FIG. 4A illustrates an exemplary table 400a illustrating a record of information stored in the map database 109. The table 400a includes multiple record entries such as record 401a (LatG,LonG) storing latitude and longitude information for a gantry, such as the gantry 201 depicted in FIG. 2.

A record 403a, O, stores origin link PVID for the gantry.

A record 405a, D, stores destination link PVID for the gantry.

A record 407a, G, stores a reference for a gantry.

A record 409a, (LatR,LonR), stores latitude and longitude information for a reference node.

A record 411a, (LatNR,LonNR), stores latitude and longitude information for a non-reference node.

A record 413a, (LatSi,LonSi), stores latitude and longitude information for a shape point, where i is the sequence number for the shape points which start from 1. The smaller i is, the closer the shape point is to the reference node.

In some example records, not illustrated in FIG. 4A, for the latitude and longitude of reference and non-reference node, their link PVID may be annotated on its up right corner. For example, $LatR^O$ may be the latitude of reference node in the origin link.

In some example records, not illustrated in FIG. 4A, latitude and longitude of shape points may be annotated with their sequence number on the down right corner. For instance, $LatS_i^O$ is the latitude of ith shape in the origin link.

Figure 4B:
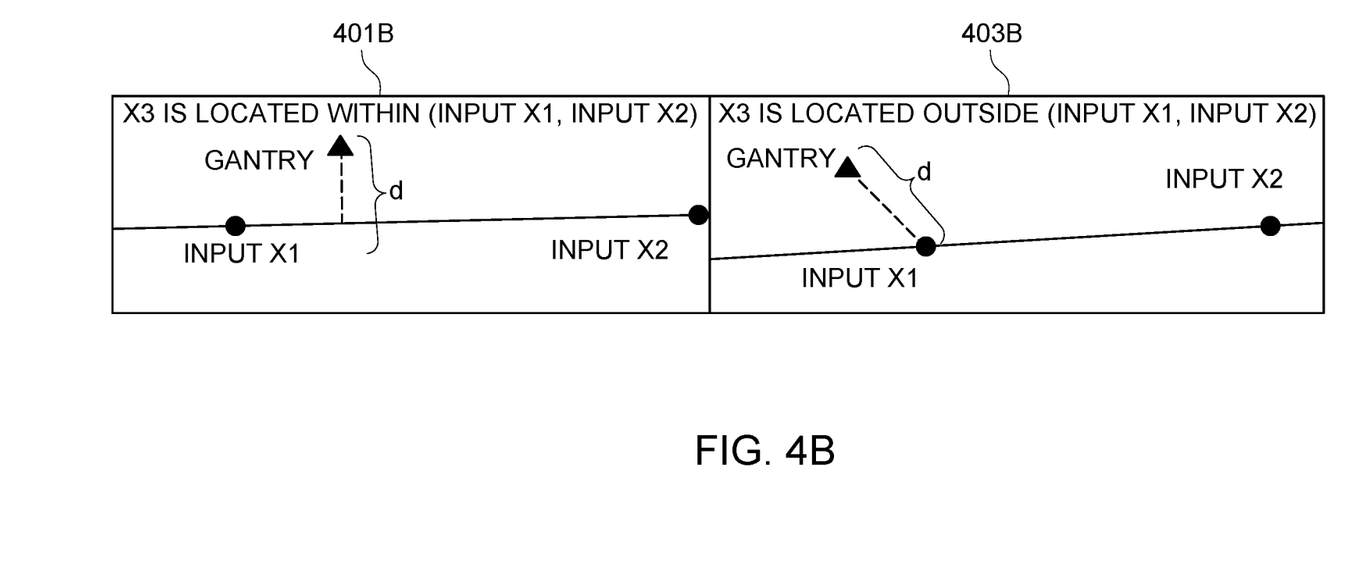

FIG. 4B illustrates an exemplary diagram of two scenarios 401B and 403B for identifying a data record stored in a map database for identifying shortest distance of the gantry from at least two consecutive shape points according to an example embodiment.

FIG. 4B illustrates two scenarios for identifying shortest distance, d, of the gantry from at least two consecutive shape points.

The shortest distance d of the gantry may be calculated from a node with coordinates (X3,Y3), which may be located on a link between an originating node (X1,Y1) and a destination node (X2,Y2). (X1,Y1) and (X2,Y2) may be the coordinates of an origin node and a destination node for a link associated with a PVID. Using the link PVID, (X1,Y1) and (X2,Y2) may be extracted from the map database 109.

The first scenario 401b indicates that a vehicle may be at a location (X3,Y3) at the time of calculation of a distance value of gantry from at least two consecutive shape points, such that (X3,Y3) is located within (X1,Y1) and (X2,Y2).

The second scenario 403b indicates that a vehicle may be at a location (X3,Y3) at the time of calculation of a distance value of gantry from at least two consecutive shape points, such that (X3,Y3) is located outside (X1,Y1) and (X2, Y2). The distance d of gantry from the node (X3,Y3) may be calculated by using a function of input values X1,Y1,X2, and Y2.

For example, a function f (InputX1, InputY1, InputX2, InputY2, X3, Y3) may provide as an output, a minimum distance d from the node (X3,Y3) to the gantry.

The output distance d may be used to map match the gantry to correct consecutive shape points on the link for calculating a correct heading value and direction information for the gantry.

The output distance d may be calculated based on the algorithm illustrated below:

---
Distance calculation method:
f (InputX1, InputY1, InputX2, InputY2, X3, Y3)
---

Input: InputX1, InputY1, InputX2, InputY2, X3, Y3
Output: d
Calculate d1 = d( (InputX1, InputY1), (InputX2, InputY2) )
Calculate s = −(InputY1 − InputY2)/(InputX1 − InputX2) ;
Calculate d21 = |s · X3 − Y3 + InputY1 − s · InputX1 |/$\sqrt{s^2+1}$;
Calculate d22 = |s · X3 − Y3 + InputY2 − s · InputX2 |/$\sqrt{s^2+1}$;
If( |d21 + d22| > |d21 − d22| )
  d = |(InputY1 − InputY2) · X3 − (InputX1 − InputX2) · Y3 + InputX1 · InputY2 −
InputX2 · InputY1 |/$\sqrt{(InputY1-InputY2)^2+(InputX1-InputX2)^2}$
If( |d21 + d22| < |d21 − d22| )
  If( d21 > d22 ) d = d((X3, Y3), (InputX2, InputY2));
  If( d21 < d22 ) d = d((X3, Y3), (InputX1, InputY1));

---

The function f (InputX1, InputY1, InputX2, InputY2, X3, Y3) will be employed in the map-matching and heading generation procedure for the gantry. The map matching and heading generation procedure may be used in the method for identifying heading value for the gantry using two steps: map-matching and heading generation.

Map-Matching Method

The map matching procedure may be used to identify the at least two consecutive shape points for heading calculation for the gantry. First, for an origin and destination link for a vehicle, at the time of heading calculation, coordinate information for the shape points associated with the origin and destination links, that is to say the at least two consecutive links, may be extracted from the map database 109.

The coordinate information for the origin link O associated with a shape point Si may be $\{LatS_i^O, LonS_i^O\}$.

The coordinate information for the destination link D associated with a shape point Sj may be $\{LatS_j^D, LonS_j^D\}$.

The coordinate information for the gantry (LatG, LonG) may also be retrieved from the map database 109. Using (LatG, LonG) a featured shape point ($LatF_s$, $LonF_s$) may be identified from either ($LatF_u^O$, $LonF_i^O$) or ($LatF_j^D$, $LonF_j^D$) which can minimize the distance from the gantry location to the segment formed by any two consecutive shape points in the link.

Thus, the featured shape point may be given by:

$LatF_s$, $LonF_s$)=($LatF_i^O$, $LonF_i^O$) or ($LatF_j^D$, $LonF_j^D$)

Which $$\underset{i \text{ or } j}{\operatorname{argmin}}\left(\left\{\begin{array}{l} f(LatS_i^O, LonS_i^O, LatS_{i+1}^O, LonS_{i+1}^O, LatG, LonG) \text{ if } 0 \leq i \leq I \\ f(LatS_j^D, LonS_j^D, LatS_{j+1}^D, LonS_{j+1}^D, LatG, LonG) \text{ if } 0 \leq j \leq J \end{array}\right\}\right)$$

where I and J are the maximum number of shape points separately for origin and destination links; ($LatS_0^O$, $LonS_0^O$)=($LatR^O$, $LonR^O$) and ($LatS_I^O$, $LonS_I^O$)=($LatNR^O$, $LonNR^O$); s in ($LatF_S$, $LonF_s$) denotes the sequence of the featured shape point in the link.

Based on identification of the featured shape point, heading value for the gantry may be calculated.

Heading Calculation

Once the featured shape point is identified, the link PVID corresponding to the featured shape point may be used to extract a reference and a non-reference node of the link for both the original and destination link.

($N^{O\_REF}$, $N^{O\_NREF}$) may be the reference and non-reference nodes of the origin link.

($N^{D_{REF}}$, $N^{D_{NREF}}$) may be the reference and non-reference nodes of the destination link.

Based on ($N^{O\_REF}$, $N^{O\_NREF}$) and ($N^{D_{REF}}$, $N^{D_{NREF}}$) it may be determined that If $N^{O_{REF}}=N^{D_{NREF}}$ $X=LonF_{s-1}-LonF_s$ $Y=LatF_{s-1}-LatF_s$ However if $N^{O\_NREF}=N^{D\_REF}$ $X=LonF_{s+1}-LonF_s$ $Y=LatF_{s+1}-LatF_s$ For consecutive shape points s−1,s, and s+1.

Using the X and Y values calculated above the heading value of the gantry can be calculated as:

$$h = \begin{cases} \arccos\left(\dfrac{Y}{\sqrt{X^2+Y^2}}\right) & \text{if } X \geq 0 \\ 360 - \arccos\left(\dfrac{Y}{\sqrt{X^2+Y^2}}\right) & \text{if } X < 0 \end{cases}$$

In some example embodiments, the heading calculation may be performed on the mapping platform 107, such as using the processing component 111 of the mapping platform 107.

In some example embodiments, the heading calculation may be performed by a navigation device installed in a vehicle, such as the user equipment 101 illustrated in FIG. 1.

In some example embodiments, the heading value h may further be used to perform navigation related services for a vehicle.

In some example embodiments, the heading value h may be stored and updated in the map database 109 on a continuous basis in near real times.

In some example embodiments, the heading value of the gantry may be used for providing direction information for the gantry in navigation related applications.

Figure 5:
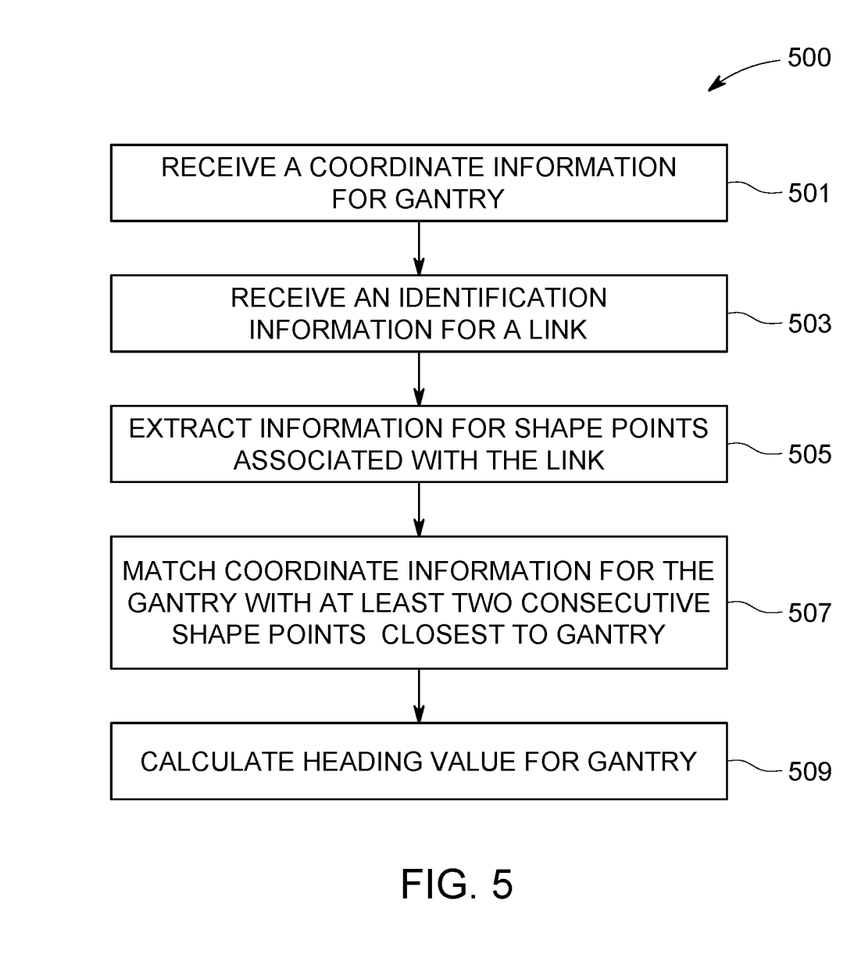
FIG. 5 illustrates a flow diagram of a method for providing heading information for a gantry according to an example embodiment.

FIG. 5 illustrates a flow diagram of a method 500 for providing direction information for a gantry according to an example embodiment.

The method 500 may include, at 501, receiving a coordinate information for the gantry. The coordinate information for the gantry may include the information (LatG, LonG), which may be received from the map database 109. The method 500 may further include, at 503, receiving an identification information for a link associated with the gantry. The identification information may be the link PVID available in a record stored in the map database 109.

The method 500 may further include, at 505, extracting information related to one or more shape points associated with the link based on the identification information, such as the link PVID. The one or more shape points may be the featured shape points which are closest to the gantry.

The method 500 may further include, at 507, matching the coordinate information for the gantry with at least two consecutive shape points from the one or more shape points such that the at least two consecutive shape points are closest from the gantry. The matching may be performing in accordance with the map matching procedure discussed in association with FIG. 4 earlier. The map matching may result in calculation of X and Y values. Once map matching for the gantry has been performed, the method may include, at 509, calculating the heading value for the gantry based on the matching. The heading value for the gantry, h, may be calculated as:

$$h = \begin{cases} \arccos\left(\dfrac{Y}{\sqrt{X^2+Y^2}}\right) & \text{if } X \geq 0 \\ 360 - \arccos\left(\dfrac{Y}{\sqrt{X^2+Y^2}}\right) & \text{if } X < 0 \end{cases}$$

The at least two consecutive shape points may be associated with a coordinate information $LatS_i$, $LonS_i$, wherein S is the shape point, i is the sequence number for the shape point, LatSi is the shape point latitude and LonSi is the shape point longitude, wherein each link is divided into a plurality of shape points.

In some example embodiments, the heading value for the gantry may be used to generate direction information for the gantry. The generated direction information for the gantry may be updated and stored to a map database.

In some example embodiments, the generated direction information for the gantry may be used for route navigation in a vehicle.

In some example embodiments, the calculation of heading may be performed by a mapping platform, such as using the processing component 111 of the mapping platform 107, and using the information stored in the map database 109.

In an example embodiment, an apparatus for performing the method 500 of FIG. 5 above may comprise a processor (e.g. the processor 111) configured to perform some or each of the operations of the method of FIG. 5 described previously. The processor may, for example, be configured to perform the operations (501-509) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (501-509) may comprise, for example, the processor 111 which may be implemented in the user equipment 101 and/or a device or circuit for executing instructions or executing an algorithm for processing information as described above.

Many modifications and other embodiments of the invention set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for generating a heading value for a gantry comprising:
   receiving a coordinate information for the gantry;
   receiving an identification information for a link associated with the gantry;
   extracting, from one or more shape point data records of a map database, information related to one or more shape points associated with the link based on the identification information, wherein the information includes latitude and longitude information and respective sequence numbers of the one or more shape points;
   matching the coordinate information for the gantry with at least two consecutive shape points from the one or more shape points based on the latitude and longitude information and the respective sequence numbers, wherein the at least two consecutive shape points are closest from the gantry;
   calculating, by a processor, the heading value for the gantry based on the matching; and
   providing the heading value as an output for a route navigation to a device.

2. The method of claim 1, wherein each of the at least two consecutive shape points is associated with a coordinate information LatS$_i$, LonS$_i$, wherein S is the shape point, i is the sequence number for the shape point, LatS$_i$ is the shape point latitude and LonSi is the shape point longitude, wherein each link is divided into a plurality of shape points.

3. The method of claim 2 wherein the link further comprises an originating link and a destination link.

4. The method of claim 3 wherein the link further comprises a reference node and a non-reference node,
   wherein a coordinate information of the originating link includes an originating link reference node coordinate and an originating link non-reference node coordinate denoted by the set ($N^{O\_REF}$,$N^{O\_NREF}$); and
   wherein a coordinate information of the destination link includes a destination link reference node coordinate and a destination link non-reference node coordinate denoted by the set ($N^{D\_REF}$, $N^{D\_NREF}$).

5. The method of claim 4, wherein the coordinate information of the at least two consecutive shape points and the coordinate information of reference and non-reference nodes is used for calculating the heading value.

6. The method of claim 5, wherein calculating the heading value comprises:
   determining if $N^{O\_REF}=N^{D\_NREF}$;
   identifying X and Y values for a featured shape point based on LatF$_s$, LonF$_s$, for the at least two consecutive shape points as X=LonF$_{s-1}$–LonF$_s$ and Y=LatF$_{s-1}$–LatF$_s$, wherein s–1 and s denote the at least two consecutive shape points; and
   calculating the heading value h as:

$$h = \begin{cases} \arccos\left(\frac{Y}{\sqrt{X^2+Y^2}}\right) & \text{if } X \geq 0 \\ 360 - \arccos\left(\frac{Y}{\sqrt{X^2+Y^2}}\right) & \text{if } X < 0. \end{cases}$$

7. The method of claim 5, wherein calculating the heading value comprises:
   determining if $N^{O\_NREF}=N^{D\_REF}$;
   identifying X and Y values for a featured shape point based on LatF$_s$, LonF$_s$ for at least two consecutive shape points as X=LonF$_{s+1}$–LonF$_s$ and Y=LatF$_{s+1}$–LatF$_s$
   wherein s and s+1 denote the at least two consecutive shape points; and
   calculating the heading value h as:

$$h = \begin{cases} \arccos\left(\frac{Y}{\sqrt{X^2+Y^2}}\right) & \text{if } X \geq 0 \\ 360 - \arccos\left(\frac{Y}{\sqrt{X^2+Y^2}}\right) & \text{if } X < 0. \end{cases}$$

8. The method of claim 1 further comprises providing the generated heading value for the gantry to a map database.

9. The method of claim 1 further comprises using the generated heading value for the gantry for route navigation in a vehicle.

10. The method of claim 1, wherein the gantry includes a posted variable speed sign.

11. A mapping platform comprising:
   at least one processor; and
   at least one memory including computer program code for one or more programs, the at least one memory and the computer program code configured to, with the at least one processor, cause the mapping platform to perform at least the following,
   receive a coordinate information for a gantry;
   receive an identification information for a link associated with the gantry;
   extract, from one or more shape point data records of a map database, information related to one or more shape points associated with the link based on the identification information, wherein the information includes latitude and longitude information and respective sequence numbers of the one or more shape points;
   match the coordinate information for the gantry with at least two consecutive shape points from the one or more shape points based on the latitude and longitude information and the respective sequence numbers, wherein the at least two consecutive shape points are closest from the gantry;
   calculate a heading value for the gantry based on the matching; and
   provide the heading value as an output for a route navigation to a device.

12. The mapping platform of claim 11, wherein each of the at least two consecutive shape points is associated with a coordinate information LatS$_i$, LonS$_i$, wherein S is the shape point, i is the sequence number for the shape point, LatS$_i$ is the shape point latitude and LonS$_i$ is the shape point longitude, wherein each link is divided into a plurality of shape points.

13. The mapping platform of claim 12 wherein the link further comprises an originating link and a destination link.

14. The mapping platform of claim 13 wherein the link further comprises a reference node and a non-reference node,
   wherein a coordinate information of the originating link includes an originating link reference node coordinate and an originating link non-reference node coordinate denoted by the set ($N^{O\_REF}$, $N^{O\_NREF}$); and
   wherein a coordinate information of the destination link includes a destination link reference node coordinate and a destination link non-reference node coordinate denoted by the set ($N^{D\_REF}$, $N^{D\_NREF}$).

15. The mapping platform of claim 14, wherein the coordinate information of the at least two consecutive shape points and the coordinate information of reference and non-reference nodes is used for calculating the heading value.

16. The mapping platform of claim 15, wherein to calculate the heading value, the map database is further caused to:
   determine if $N^{O\_REF}=N^{D\_NREF}$;
   identify X and Y values for a featured shape point based on LatF$_s$, LonF$_s$ for the at least two consecutive shape points as X=LonF$_{s-1}$–LonF$_s$ and Y=LatF$_{s-1}$–LatF$_s$, wherein s–1 and s denote the at least two consecutive shape points; and
   calculate the heading value h as:

$$h = \begin{cases} \arccos\left(\frac{Y}{\sqrt{X^2+Y^2}}\right) & \text{if } X \geq 0 \\ 360 - \arccos\left(\frac{Y}{\sqrt{X^2+Y^2}}\right) & \text{if } X < 0. \end{cases}$$

17. The mapping platform of claim 15, wherein to calculate the heading value, the map database is further caused to:

determine if $N^{O\_NREF}=N^{D\_REF}$;

identify X and Y values for a featured shape point based on $LatF_s$, $LonF_s$ for at least two consecutive shape points as $X=LonF_{s+1}-LonF_s$ and $Y=LatF_{s+1}-LatF_s$ wherein s and s+1 denote the at least two consecutive shape points; and calculate the heading value h as:

$$h = \begin{cases} \arccos\left(\dfrac{Y}{\sqrt{X^2+Y^2}}\right) & \text{if } X \geq 0 \\ 360 - \arccos\left(\dfrac{Y}{\sqrt{X^2+Y^2}}\right) & \text{if } X < 0. \end{cases}$$

18. The mapping platform of claim 11 further comprises using the generated direction information for the gantry for route navigation in a vehicle.

19. A computer program product comprising at least one non-transitory computer-readable storage medium having computer-executable program code instructions stored therein, the computer-executable program code instructions comprising program code instructions for:

receiving a coordinate information for a gantry;

receiving an identification information for a link associated with the gantry;

extracting, from one or more shape point data records of a map database, information related to one or more shape points associated with the link based on the identification information, wherein the information includes latitude and longitude information and respective sequence numbers of the one or more shape points;

matching the coordinate information for the gantry with at least two consecutive shape points from the one or more shape points based on the latitude and longitude information and the respective sequence numbers, wherein the at least two consecutive shape points are closest from the gantry;

calculating a heading value for the gantry based on the matching; and providing the heading value as an output for updating the map database.

20. The method of claim 1, wherein the respective sequence numbers is based on a closeness to a reference node of the link.

* * * * *